(12) United States Patent
Chang et al.

(10) Patent No.: US 7,804,956 B2
(45) Date of Patent: Sep. 28, 2010

(54) BIOMETRICS-BASED CRYPTOGRAPHIC KEY GENERATION SYSTEM AND METHOD

(75) Inventors: Yao-Jen Chang, Taipei (TW); Tsu-Han Chen, Pittsburgh, PA (US); Wen-De Zhang, Pittsburgh, PA (US)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1434 days.

(21) Appl. No.: 11/077,014

(22) Filed: Mar. 11, 2005

(65) Prior Publication Data

US 2006/0083372 A1    Apr. 20, 2006

(30) Foreign Application Priority Data

Oct. 15, 2004    (TW) .............................. 93131413 A

(51) Int. Cl.
*H04L 9/22* (2006.01)
*G10L 19/00* (2006.01)

(52) U.S. Cl. ......................... 380/44; 713/186; 704/230; 704/231; 704/237

(58) Field of Classification Search .................. 380/44; 382/100, 115–119; 704/230, 231, 237; 713/186
See application file for complete search history.

(56) References Cited

U.S. PATENT DOCUMENTS

| 5,541,994 | A | | 7/1996 | Tomko et al. |
| 5,712,912 | A | | 1/1998 | Tomko et al. |
| 5,737,420 | A | * | 4/1998 | Tomko et al. ............... 380/285 |
| 5,832,091 | A | | 11/1998 | Tomko et al. |
| 5,991,408 | A | | 11/1999 | Pearson et al. |
| 6,035,398 | A | * | 3/2000 | Bjorn ......................... 713/186 |
| 6,167,517 | A | | 12/2000 | Gilchrist et al. |
| 6,182,221 | B1 | | 1/2001 | Hsu et al. |
| 6,219,793 | B1 | | 4/2001 | Li et al. |
| 6,219,794 | B1 | | 4/2001 | Soutar et al. |
| 6,310,966 | B1 | | 10/2001 | Dulude et al. |
| 6,317,834 | B1 | * | 11/2001 | Gennaro et al. ............. 713/186 |
| 6,507,912 | B1 | * | 1/2003 | Matyas et al. ............... 713/186 |
| 6,901,145 | B1 | * | 5/2005 | Bohannon et al. ............. 380/44 |
| 7,095,852 | B2 | * | 8/2006 | Wack et al. ................... 380/44 |

(Continued)

OTHER PUBLICATIONS

Fabian Monrose et. al.; *Cryptographic Key Generation from Voice*; 2001; IEEE; pp. 202-213.

(Continued)

*Primary Examiner*—Edan Orgad
*Assistant Examiner*—Yin-Chen Shaw
(74) *Attorney, Agent, or Firm*—Bacon & Thomas, PLLC

(57) ABSTRACT

The present invention provides a biometrics-based cryptographic key generation system and method. A user-dependent distinguishable feature transform unit provides a feature transformation for each authentic user, which receives N-dimensional biometric features and performs a feature transformation to produce M-dimensional feature signals, such that the transformed feature signals of the authentic user are compact in the transformed feature space while those of other users presumed as imposters are either diverse or far away from those of the authentic user. A stable key generation unit receives the transformed feature signals to produce a cryptographic key based on bit information respectively provided by the M-dimensional feature signals, wherein the length of the bit information provided by the feature signal of each dimension is proportional to the degree of distinguishability in the dimension.

15 Claims, 3 Drawing Sheets

U.S. PATENT DOCUMENTS

| | | | |
|---|---|---|---|
| 2002/0095587 | A1 | 7/2002 | Doyle et al. |
| 2003/0101349 | A1 | 5/2003 | Wang |
| 2003/0140232 | A1 | 7/2003 | De Lanauze |
| 2003/0140235 | A1 | 7/2003 | Immega et al. |
| 2003/0219121 | A1 | 11/2003 | van Someren |
| 2004/0034784 | A1 | 2/2004 | Fedronic et al. |
| 2004/0049687 | A1* | 3/2004 | Orsini et al. ............ 713/189 |
| 2004/0059924 | A1 | 3/2004 | Soto et al. |

OTHER PUBLICATIONS

Ian Jermyn et. al.; *The Design and Analysis of Graphical Passwords*; Aug. 1999; Usenix; 15 pp.

Colin Soutar et. al.; *Biometric Encryption*™; 1999; pp. 1-28.

Richard O. Duda et. al.; *Pattern Classification*; Second Edition; 2001; pp. 117-121.

Wende Zhang et. al.; *Personal Authentication Based on Generalized Symmetric Max Minimal Distance in Subspace*; 2003; IEEE; pp. 245-248.

Adi Shamir; *How to Share a Secret*; Communication of the ACM; Nov. 1979; vol. 22, No. 11; pp. 612-613.

Toshihiko Okada et. al.; *An optimal Orthonormal System for Discriminant Analysis*; 1985; Pattern Recognition, vol. 18, No. 2; pp. 139-144.

Yao-Jen Chang et. al.; *Biometrics-Based Cryptograohic Key Generation*; 2004; IEEE; 5 pp.

Wende Zhang et. al.; *Optimal Thresholding for Key Generation Based on Biometrics*; 2004; IEEE; 5 pp.

* cited by examiner

BIOMETRICS-BASED CRYPTOGRAPHIC KEY GENERATION SYSTEM AND METHOD

BACKGROUND OF THE INVENTION

1. Field of the Invention

The present invention relates to the technical filed of cryptographic key generation and, more particularly, to a biometrics-based cryptographic key generation system and method.

2. Description of Related Art

Cryptographic keys are widely used in access control to computing resources, bank accounts in ATM systems, and user validation in e-business. Conventionally, system random-selected or user-determined PINs and passwords are utilized to generate unique keys for access control. However, system random-selected keys are easy to forget and user-determined keys are subject to dictionary attacks and also easy to transfer thereby resulting in security concerns. Relatively, biometrics, such as face, voice, iris and fingerprint, contribute specific characteristics of each individual. Therefore, biometric data potentially can be taken as good alternatives or supplements to PINs and passwords to provide a higher safety control.

Biometrics-based authentication can be mainly classified as two mechanisms: (1) biometrics-based authentication access control mechanism; and (2) biometrics-based cryptographic key generation mechanism. Please refer to FIG. 1. FIG. 1 illustrates the system structure of the biometrics-based authentication access control mechanism which achieves access control according to the biometrics-based authentication method. In the system registration phase, the access control mechanism transforms user's biometric features into a template; in the authentication phase, the mechanism utilizes the template to perform a comparison with user's biometric features. If user's biometric features match the template, the user is confirmed as an authentic user and able to access personal information protected under the system. The personal information includes cryptographic keys, smart cards, or information for other access control purposes, such as wireless communication, or system resources. Further, the access control mechanism can directly transform the adopted template into the cryptographic key once user's biometric features match the template.

However, though the aforesaid access control mechanism can adjust the tolerance for biometric feature diversities by adjusting parameters of the comparison mechanism, the template still may reveal complete information regarding user's biometric features. Consequently, the comparison between the template and user's biometric features should be performed under an absolutely secure environment. Otherwise, user's personal information would be seriously threatened.

With reference to FIG. 2, there is shown a system structure of the biometrics-based cryptographic key generation mechanism. This mechanism is different from the aforementioned access control mechanism in the way of generating the template. In this mechanism, the template is obtained by performing an operation to registered biometric features and a password generated by a random number generator 21. Therefore, in the authentication phase, the password can be obtained after performing an inverse operation to the inputted biometric features and the template. The operations could be addition, subtraction, multiplication, division, and XOR operation.

In the above system structure, the password can only be accurately generated by performing the inverse operation to the correctly inputted biometric features with the template stored in the system. Therefore, even successfully capturing the template, an impostor or attacker still cannot access user's cryptographic key such that the safety of usage is significantly improved. However, since this kind of mechanism doesn't have any comparison mechanism for adjusting the tolerance to the diversity of biometric features, very stable biometric features, such as fingerprints, have to be adopted under strict criteria (e.g. using a specific device, or applying a specific algorithm) in order to generate stable biometric features during each usage.

To eliminate this drawback, U.S. Patent Publication No. 2003/0219121 proposes a solution by adding an error correction code to the password, so as to tolerate the incorrectly inputted password within a fixed number of error bits and automatically correct the password. However, because biometric features may vary with individual dimensional diversities, adding the error correction code still fails in optimizing the tolerance adjustment for individual dimensional diversities.

A known cryptographic key generation method is proposed to perform binarization to biometric features in each dimension (F. Monrose, M. K. Reiter, Q. Li, and S. Wetzel, "Cryptographic key generation from voice," Proceedings of the 2001 IEEE Symposium on Security and Privacy, pp. 202~213, May 2001). Therefore, a fixed password can be generated by utilizing a secret sharing scheme (A. Shamir, "How to share a secret," Communications of the ACM, Vol. 22, No. 11, pp. 612-613, November 1979) even if biometric features have diversities under certain dimensions. However, this solution is only suitable for binarized biometric features. Furthermore, since diversities are only divided into stable diversities and unstable diversities, the characteristic that biometric features in different dimensions have different distinguishabilities and different degrees of diversities are still not thoroughly considered and utilized.

Based on the above analysis, a satisfactory biometrics-based cryptographic key generation mechanism should be capable of not only preventing the adopted information, such as templates, from revealing user's authentic biometric feature information, but also tolerating the characteristic that inputted biometric features have different diversities in different dimensions. Moreover, besides the diversity issue, the key space of the generated cryptographic key could be much more expanded if taking different degrees of distinguishabilities with biometric features in different dimensions into consideration.

Therefore, it is desirable to provide an improved biometrics-based cryptographic key generation system and method to mitigate and/or obviate the aforementioned problems.

SUMMARY OF THE INVENTION

The objection of the present invention is to provide a biometrics-based cryptographic key generation system and method for generating cryptographic keys according to biometric features of authentic users in a unique and stable way, and increasing the length of the key so as to expand the key space more effectively. The system and method of the invention are, as is usual for a cryptographic key generation system and method, implemented on a computer by a set of instructions stored in a non-transitory computer readable medium.

To achieve the object, the biometrics-based cryptographic key generation system comprises a user-dependent distinguishable feature transform unit and a stable key generation unit. The user-dependent distinguishable feature transform unit provides a feature transformation for each authentic user, which receives N-dimensional biometric features and performs a feature transformation to produce M-dimensional feature signals, such that the transformed feature signals of the authentic user are compact in the transformed feature space while the transformed feature signals of imposters are diverse and far away from the transformed feature signals of the authentic user. The stable key generation unit receives the transformed feature signals to produce a cryptographic key based on bit information respectively provided by the M-dimensional feature signals, wherein the length of the bit information provided by the feature signal of each dimension is proportional to the degree of distinguishability in the dimension, while the distinguishability in each dimension is defined based on the statistics of authentic feature signals and global feature signals.

According to another aspect of the present invention, a biometrics-based cryptographic key generation method comprises a user-dependent distinguishable feature transform step and a stable key generation step. The user-dependent distinguishable feature transform step provides a feature transformation for each authentic user, which receives N-dimensional biometric features and performs a feature transformation to produce M-dimensional feature signals, such that the transformed feature signals of the authentic user are compact in the transformed feature space while the transformed feature signals of imposters are diverse and far away from the transformed feature signals of the authentic user. The stable key generation step receives the transformed feature signals to produce a cryptographic key based on bit information respectively provided by the M-dimensional feature signals, wherein the length of the bit information provided by the feature signal of each dimension is proportional to the degree of distinguishability in the dimension, while the distinguishability in each dimension is defined based on the statistics of authentic feature signals and global feature signals.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
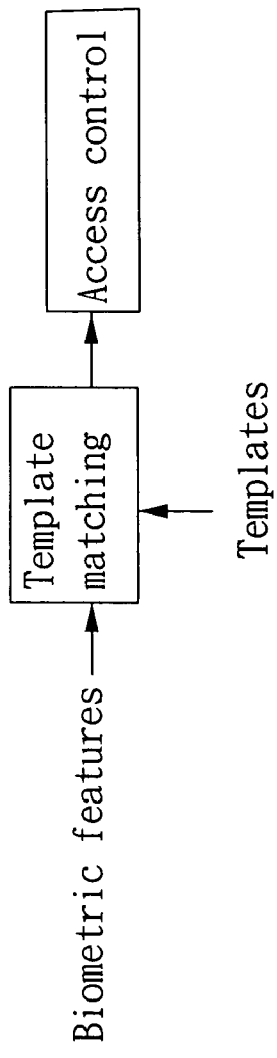
FIG. 1 illustrates a system structure of a conventional biometrics-based authentication access control mechanism.
Figure 2:
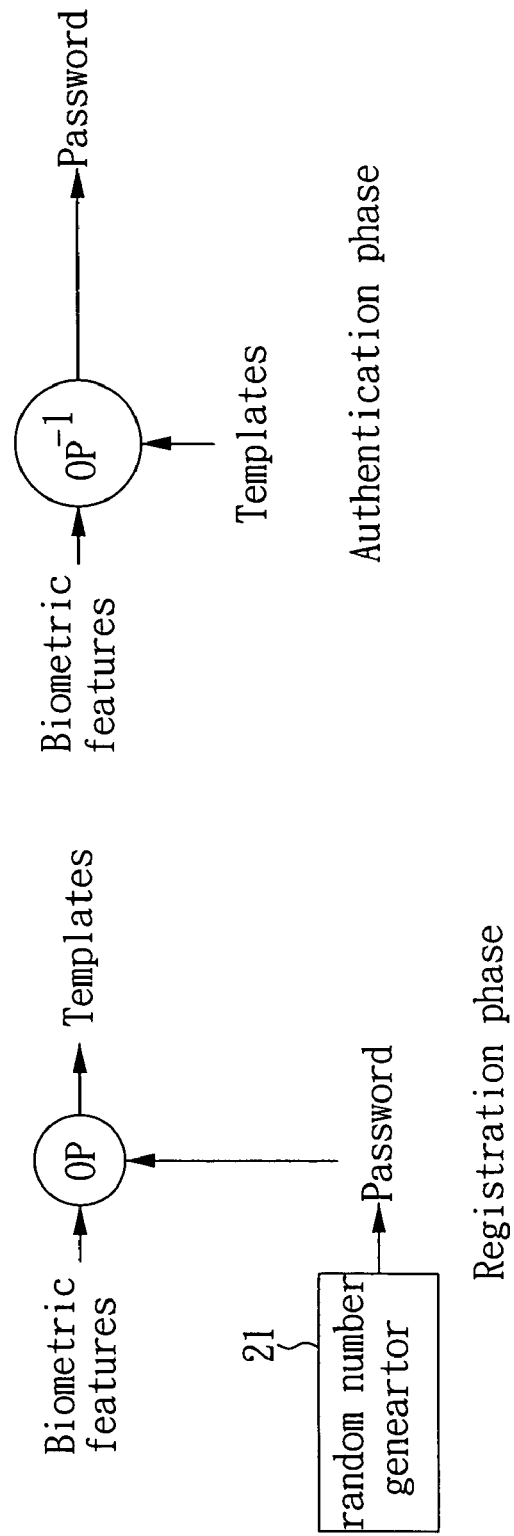
FIG. 2 illustrates a system structure of a conventional biometrics-based cryptographic key generation mechanism.
Figure 3:
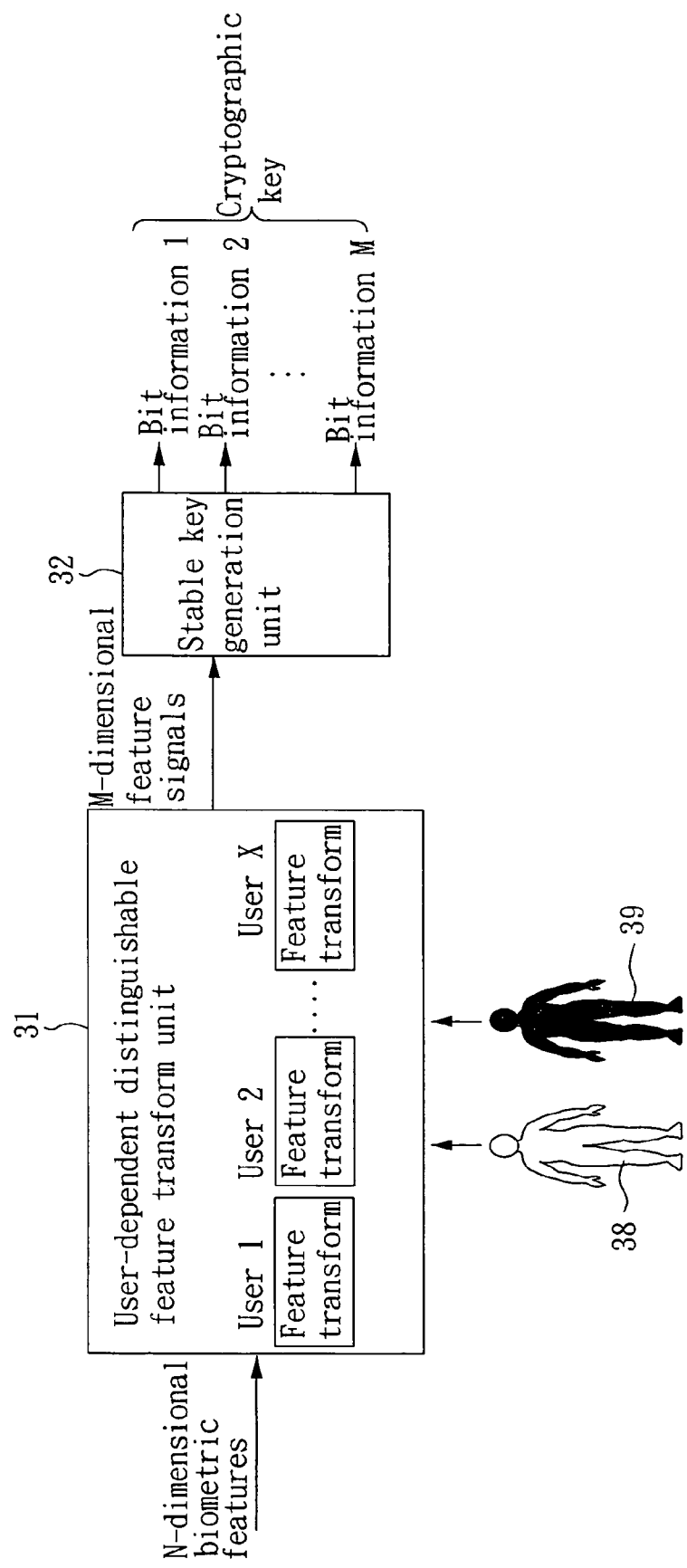
FIG. 3 is a schematic drawing of the biometrics-based cryptographic key generation system according to the present invention.

Please refer to FIG. 3. FIG. 3 illustrates the system structure of the biometrics-based cryptographic key generation system and method according to one embodiment of the present invention. As shown in FIG. 3, the system comprises a user-dependent distinguishable feature transform unit 31 and a stable key generation unit 32. The user-dependent distinguishable feature transform unit 31 receives N-dimensional biometric features and performs a feature transformation to produce M-dimensional feature signals, such that the transformed feature signals of the authentic user are compact in the transformed feature space, while those of other users presumed as imposters are either diverse or far away from those of the authentic user. The stable key generation unit 32 receives the transformed feature signals to generate 1-bit or multi-bit stable bit information according to the difference of the feature distinguishability in each dimension so as to cascade the bit information for producing a cryptographic key, wherein the distinguishability in each dimension is defined based on the statistics of authentic feature signals and global feature signals.

In the aforementioned system structure, the user-dependent distinguishable feature transform unit 31 provides a feature transformation for each user. For one feature transformation, the corresponding user is the authentic user 38. In a training phase of the user-dependent distinguishable feature transform unit 31, multiple users' feature signals are collected as training samples, wherein one of the multiple users is the authentic user 38, while others are presumed as imposters 39. Based on biometric features of the authentic user 38 and those of imposters 39, the above user-dependent distinguishable feature transform unit 31 finds a transformation in the N-dimensional feature space such that the M-dimensional feature signals transformed according to the N-dimensional biometric features can effectively distinguish the authentic user 38 from imposters 39. That is, user-dependent distinguishable feature transform unit 31 is designed in such a manner that: the feature signal distribution distance between authentic users and imposters is increased, and the transformed feature signals of the authentic user are compact in the transformed feature space while those of imposters are diverse.

The aforesaid user-dependent distinguishable feature transform unit 31 can be implemented according to a cascaded linear discriminant analysis (CLDA), which is obtained by repeating a linear discriminant analysis (LDA). LDA is known for generation of discriminative low dimensional features from a high dimensional feature space based on Fisher's discriminant criterion which maximizes the ratio of the determinant of the between-class scatter matrix of the transformed features to the determinant of the within-class scatter matrix of the transformed features. That is, it would be better if projected feature signals are farther from each other in different classes, and more compact in the same class. Therefore, for two-class classification that separates features of the authentic user 38 and all other imposters 39, the optimal projection vector can be derived as follows:

$$w = S_w^{-1}(m_a - m_t)/\|S_w^{-1}(m_a - m_t)\|, \qquad [\text{Eq.1}]$$

where $S_w = 0.5(S_a + S_t)$, in which $S_a$ and $S_t$ are covariance matrices of features of the authentic user 38 and imposters 39, respectively, and $m_a$ and $m_t$ are the mean of biometric features of the authentic user 38 and imposters 39.

In this regard, CLDA is adopted for transforming the N-dimensional biometric features to M-dimensional feature signals. With reference to [Eq.1], only one optimal projection vector can be found which projects high-dimensional biometric features to one-dimensional feature space. To derive more discriminative projection vectors, the original biometric features are projected to the null-space of the one-dimensional feature space defined by the optimal project vector, and then use [Eq.1] to find the optimal projection vector within the null-space. By repeating the above procedures M times, M projection vectors can be derived so as to transform N-dimensional biometric features to M-dimensional feature signals. According to [Eq.1], each dimension of the transformed biometric features occupies a compact region and the distance between the mean of the samples of the authentic user 38 and imposters 39 is maximized, which satisfies the requirements of distinguishability.

The above user-dependent distinguishable feature transform unit 31 can also be implemented according to a generalized symmetric max minimal distance in subspace (GSMMS) criterion, which seeks an optimal projection vector from multi-dimensional feature spaces so as to use two linear planes to separate the samples of the authentic user 38 and imposters 39. The optimal projection vector is derived iteratively such that the minimal distance of the transformed features between the authentic user 38 and imposters 39 is maximized. That is:

$$w^* = \arg \max_w \left\{ \min_{i,j} |w^T f_{t,i} - w^T f_{a,j}| \right\}, \quad [\text{Eq.2}]$$

where $f_{t,i}$ and $f_{a,j}$ are biometric features of the i-th sample collected from imposters 39 and biometric features of the j-th sample collected from the authentic user 38. To simplify the optimization, the transformed feature of the authentic user 38 is assumed to be evenly distributed and surrounded the mean of the projected value of the authentic user 38. Hence, the optimal projection vector can be expressed as follows:

$$w^* = \arg \max_w \left\{ \min_i |w^T f_{t,i} - b| - \max_j |w^T f_{a,j} - b| \right\}, \quad [\text{Eq.3}]$$

where $b = \text{mean}(w^T f_{a,j})$, i.e., the mean of the projected value of the training samples of the authentic user 38.

Multiple projection vectors can be obtained by projecting to the null-space as described in CLDA, or by directly projecting M orthogonal projection vectors to biometric features so as to produce M-dimensional features such that the minimal distance of the transformed features between the authentic user 38 and imposters 39 is maximized. Therefore, those obtained multiple projection vectors are adopted for producing M-dimensional discriminative feature signals.

After performing feature transformation to biometric features according to the above user-dependent distinguishable feature transform unit 31, the transformed feature signals of the authentic user 38 are compact in the transformed feature space, while those of imposters 39 are either diverse or far away from those of the authentic user 38. Therefore, the following stable key generation unit 32 generates the cryptographic key according to different bit information stably provided by feature signals in each dimension according to different distinguishabilities. That is, high-discriminative biometric features provide more bit information, while low-discriminative biometric features provide less bit information, therefore, the cryptographic key is generated by cascading those provided bit information.

Figure 4:
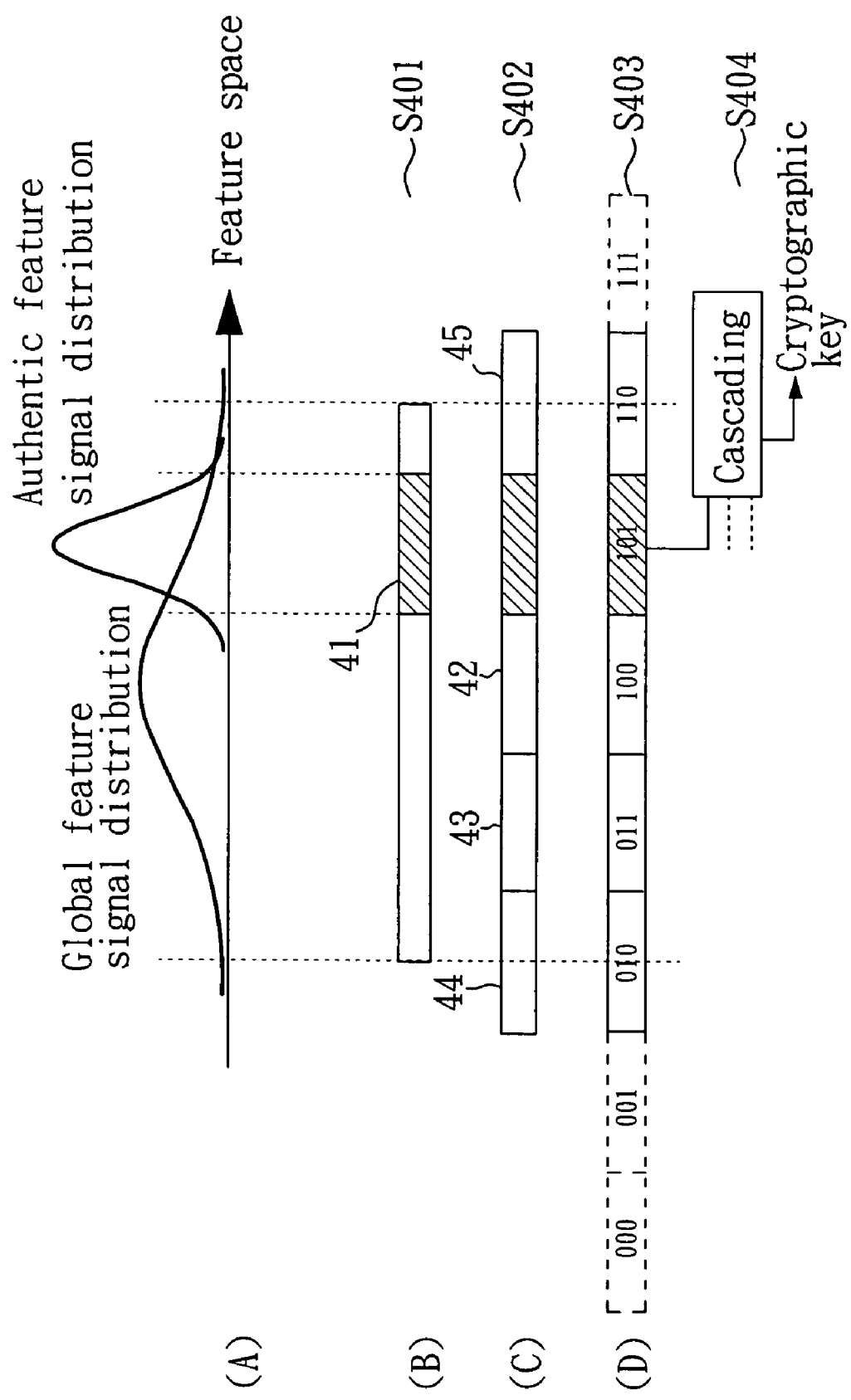
FIG. 4 is a schematic drawing of the processing procedure of the stable key generation unit according to the present invention.

With reference to FIG. 4, FIG. 4 depicts the processing procedure of the stable key generation unit 32. FIG. 4(A) illustrates the feature signal distribution of both the authentic user 38 and global users in a specific dimension. In accordance with step S401 shown in FIG. 4(B), FIG. 4(B) shows the position of the left boundary (LB), the right boundary (RB), and an authentic region of the feature signals corresponding to the authentic user 38. Step S401 sets the left and right boundaries for each feature to be:

$LB = \min(m_g - k_g \sigma_g, m_a - k_a \sigma_a)$, and $RB = \max(m_g + k_g \sigma_g, m_a + k_a \sigma_a)$, where $m_a$ and $\sigma_a$ are the mean and standard deviation of the authentic feature signal distribution in the corresponding dimension, $m_g$ and $\sigma_g$ are the mean and standard deviation of a global feature signal distribution in the corresponding dimension. While in this embodiment, the value of $k_g$ is set to be 5 to cover almost 100% of the global feature distribution, and $k_a$ is a parameter utilized to control the range $(m_a - k_a \sigma_a, m_a + k_a \sigma_a)$ to be specified as the authentic region so as to define the length of the segment 41 corresponding to the authentic region as $2k_a \sigma_a$. The parameter $k_a$ can be set as not only a fixed value parameter adopted for each dimension, but also different values for different dimensional feature signal. For example, a receiver operation characteristic (ROC) curve can be utilized for optimal parameter setting in order to achieve a better efficiency.

With reference to step S402 shown in FIG. 4(C), FIG. 4(C) illustrates segments with the same size as the authentic region to cover the range between LB and RB. Step S402 utilizes the segment 41 corresponding to the authentic region obtained in step S401 to devide at least one segment of the same size as the authentic region between LB and RB. In detail, from LB to the left boundary $(m_a - k_a \sigma_a)$ of the authentic region, there are $LS = \lceil (m_a - k_a \sigma_a - LB)/2k_a \sigma_a \rceil$ segments of the same size as the authentic region (i.e. the segment 41). In this embodiment, three segments 42, 43, 44 are divided. Similarly, there are $RS = \lceil (RB - m_a - k_a \sigma_a)/2k_a \sigma_a \rceil$ segments from the right boundary $(m_a + k_a \sigma_a)$ of the authentic region to RB. In this embodiment, one segment 45 is divided. Therefore, there are (LS+RS+1)=5 segments 41~45 to cover the range (LB, RB).

Please refer to step S403 shown in FIG. 4(D), it depicts the corresponding index to each of the above segments 41~45. Step S403 respectively specifies segments 41~45 obtained in step S402 with indices. In this embodiment, at least $\lceil \log_2(LS+RS+1) \rceil = 3$ bits are sufficient to specify each segment with a unique index because three bits can be utilized to generate eight indices, wherein five indices are respectively adopted for specifying the index of each of segments 41~45, while three redundant indices are randomly added to three extra segments beyond LB and RB. As shown in FIG. 4(D), the index of each segment is sequentially specified according to the position of each segment in the feature space. Therefore, the index for the authentic region for this feature is 101 as the bit information in the existing dimension in this embodiment.

Further, step S404 cascades the bit information provided by the feature signal in each corresponding dimension to obtain the cryptographic key. With the above steps, the cryptographic key with length $$\sum_{i=1}^{M} \lceil \log_2(LS_i + RS_i + 1) \rceil$$

can be generated by cascading all indices of authentic regions from the M-dimensional feature space.

In view of the foregoing, it is known that the biometrics-based cryptographic key generation system and method of the present invention uses the user-dependent distinguishable feature transform unit 31 to enhance the distinguishability of transformed biometric features, and uses the stable key generation unit 32 to make biometric features with different distinguishabilities contribute bit information with different lengths. Further, the stable key generation unit 32 utilizes the statistical characteristics of biometric features in different dimensions to tolerate different diversities of biometric features inherent in different dimensions. Therefore, biometric features inherent with diversities can be transformed to a stable cryptographic key with a longer length. In this regard, not only a unique and stable cryptographic key can be generated based on authentic biometric features, but also the length of key can be increased for efficiently expanding the key space so as to prevent attackers from guessing keys by exhaustive search in a short period.

Although the present invention has been explained in relation to its preferred embodiment, it is to be understood that many other possible modifications and variations can be made without departing from the spirit and scope of the invention as hereinafter claimed.

What is claimed is:

1. A biometrics-based cryptographic key generation system including a cryptographic key generation mechanism implemented on a computer by a set of instructions stored in a non-transitory computer-readable medium, said cryptographic key generation mechanism comprising:

a user-dependent distinguishable feature transform unit included in said key generation mechanism for providing each authentic user a specific feature transformation trained with biometric features from both authentic user and non-authentic users, and receiving N-dimensional biometric features for performing the feature transformation to produce M-dimensional feature signals according to a cascaded linear discriminant analysis (CLDA) obtained by repeating a linear discriminant analysis multiple times, such that the transformed feature signals of the authentic user are compact in a transformed feature space while the transformed feature signals of non-authentic users presumed as imposters are diverse and far from the transformed feature signals of the authentic user; and a stable key generation unit included in said key generation mechanism for receiving the transformed feature signals to produce a cryptographic key based on bit information respectively provided by the M-dimensional feature signals, wherein a length of the bit information provided by the feature signal of each dimension is proportional to a degree of distinguishability determined by a compactness of a feature distribution of the authentic user with respect to a diversity of global feature distribution of all users in a corresponding dimension.

2. The system as claimed in claim 1, wherein the stable key generation unit produces the cryptographic key by cascading the bit information provided by the M-dimensional feature signals.

3. The system as claimed in claim 1, wherein the user-dependent distinguishable feature transform unit transforms the N-dimensional biometric features to M-dimensional feature signals according to a generalized symmetric max minimal distance in subspace (GSMMS) criterion.

4. A biometrics-based cryptographic key generation method implemented on a computer that includes a key generation mechanism, said method comprising:

a user-dependent distinguishable feature transform step implemented by a user-dependent distinguishable feature transform unit of the key generation mechanism for providing each authentic user a specific feature transformation trained with biometric features from both the authentic user and non-authentic users, and receiving N-dimensional biometric features for performing the feature transformation to produce M-dimensional feature signals according to a cascaded linear discriminant analysis (CLDA) obtained by repeating a linear discriminant analysis multiple times, such that the transformed feature signals of the authentic user are compact in a transformed feature space while the transformed feature signals of non-authentic users presumed as imposters are diverse and far from the transformed feature signals of the authentic user; and a stable key generation step implemented by a stable key generation unit of the key generation mechanism for receiving the transformed feature signals to produce a cryptographic key based on bit information respectively provided by the M-dimensional feature signals, wherein a length of the bit information provided by the feature signal of each dimension is proportional to a degree of distinguishability determined by a compactness of a feature distribution of the authentic user with respect to a diversity of global feature distribution of all users in a corresponding dimension.

5. The method as claimed in claim 4, wherein the user-dependent distinguishable feature transform step transforms the N-dimensional biometric features to M-dimensional feature signals according to a generalized symmetric max minimal distance in subspace (GSMMS) criterion.

6. A biometrics-based cryptographic key generation method implemented on computer including a key generation mechanism, said method comprising:

a user-dependent distinguishable feature transform step implemented by a user-dependent distinguishable feature transform unit of the key generation mechanism for providing each authentic user a specific feature transformation trained with biometric features from both the authentic user and non-authentic users, and receiving N-dimensional biometric features for performing the feature transformation to produce M-dimensional feature signals, such that the transformed feature signals of the authentic user are compact in a transformed feature space while the transformed feature signals of imposters are diverse and far from the transformed feature signals of the authentic user; and a stable key generation step implemented by a stable key generation unit of the key generation mechanism for receiving the transformed feature signals to produce a cryptographic key based on bit information respectively provided by the M-dimensional feature signals, the stable key generation step including:

a setting step for setting a left boundary and a right boundary of a feature signal distribution in each dimension, and defining an authentic region of an authentic feature signal distribution, a distinguishing step for dividing at least one segment between the left boundary and the right boundary in a corresponding dimension according to an authentic region, where a length of each segment is proportional to the authentic region, an index specifying step for specifying the segment with an index thereby obtaining authentic bit information provided by the feature signal in a corresponding dimension, and a cascading step for cascading the bit information provided by the feature signal in each corresponding dimension for obtaining a cryptographic key, wherein a length of the bit information provided by the feature signal of each dimension is proportional to a degree of distinguishability in the corresponding dimension and the setting step sets the left boundary of the feature signal distribution in each dimension as $LB=\min(m_g-k_g\sigma_g, m_a-k_a\sigma_a)$, and sets the right boundary as $RB=\max(m_g+k_g\sigma_g, m_a+k_a\sigma_a)$, where $m_a$ and $\sigma_a$ are mean and standard deviation of an authentic feature signal distribution in the corresponding dimension, $m_g$ and $\sigma_g$ are mean and standard deviation of a global feature signal distribution in the corresponding dimension, $k_a$ and $k_g$ are parameters, and $(m_a-k_a\sigma_a, m_a+k_a\sigma_a)$ is specified as the authentic region.

7. The method as claimed in claim 6, wherein $k_g$ is a fixed value parameter.

8. The method as claimed in claim 6, wherein $k_a$ is a fixed value parameter for each dimension.

9. The method as claimed in claim 6, wherein $k_a$ is defined as different parameters for different dimensions.

10. The method as claimed in claim 9, wherein $k_a$ is defined according to a receiver operation characteristic (ROC) curve optimization.

11. The method as claimed in claim 6, wherein in the distinguishing step, $LS=\lceil (m_a-k_a\sigma_a-LB)/(2k_a\sigma_a) \rceil$ segments of the same size as the authentic region are divided between the left boundary of the feature signal distribution and the left boundary $(m_a-k_a\sigma_a)$ of the authentic region, and $RS=\lceil (RB-m_a-k_a\sigma_a)/(2k_a\sigma_a) \rceil$ segments of the same size as the authentic region are divided between the right boundary $(m_a+k_a\sigma_a)$ of the authentic region and the right boundary of the feature signal distribution, such that (LS+RS+1) segments are divided between the left boundary and the right boundary of the feature signal distribution.

12. The method as claimed in claim 11, wherein the index specifying step assigns each segment with the index according to $\lceil \log_2 (LS+RS+1) \rceil$ bits.

13. A biometrics-based cryptographic key generation system including a cryptographic key generation mechanism implemented on a computer by a set of instructions stored in a non-transitory computer-readable medium, said cryptographic key generation mechanism, comprising:

a user-dependent distinguishable feature transform unit implemented in said key generation mechanism for providing each authentic user a specific feature transformation trained with biometric features from both authentic user and non-authentic users, and receiving N-dimensional biometric features for performing the feature transformation to produce M-dimensional feature signals, such that the transformed feature signals of the authentic user are compact in a transformed feature space while the transformed feature signals of non-authentic users presumed as imposters are diverse and far from the transformed feature signals of the authentic user; and a stable key generation unit implemented in said key generation mechanism for receiving the transformed feature signals to produce a cryptographic key based on bit information respectively provided by the M-dimensional feature signals, wherein a length of the bit information provided by the feature signal of each dimension is proportional to a degree of distinguishability determined by a compactness of a feature distribution of the authentic user with respect to a diversity of global feature distribution of all users in a corresponding dimension, wherein the stable key generation unit divides at least one segment between a left boundary and a right boundary of a feature space in each dimension according to the authentic region of the authentic feature signal distribution, and specifies the segment with an index, thereby obtaining the authentic bit information provided by the feature signal in the corresponding dimension, where the left boundary of is defined as $LB=\min(m_g-k_g\sigma_g, m_a-k_a\sigma_a)$, the right boundary is defined as $RB=\max(m_g+k_g\sigma_g, m_a+k_a\sigma_a)$, and the authentic region is defined as $(m_a-k_a\sigma_a, m_a+k_a\sigma_a)$, for $m_a$ and $\sigma_a$ are the mean and standard deviation of the authentic feature signal distribution in the corresponding dimension, $m_g$ and $\sigma_g$ are the mean and standard deviation of a global feature signal distribution in the corresponding dimension, and $k_a$ and $k_g$ are parameters.

14. A biometrics-based cryptographic key generation method implemented on a computer device having a key generating mechanism, comprising:

a user-dependent distinguishable feature transform step implemented by a user-dependent distinguishable feature transform unit of the key generation mechanism for providing each authentic user a specific feature transformation trained with biometric features from both the authentic user and non-authentic users, and receiving N-dimensional biometric features for performing the feature transformation to produce M-dimensional feature signals, such that the transformed feature signals of the authentic user are compact in a transformed feature space while the transformed feature signals of non-authentic users presumed as imposters are diverse and far from the transformed feature signals of the authentic user; and a stable key generation step implemented by a stable key generation unit of the key generation mechanism for receiving the transformed feature signals to produce a cryptographic key based on bit information respectively provided by the M-dimensional feature signals, wherein a length of the bit information provided by the feature signal of each dimension is proportional to a degree of distinguishability determined by a compactness of the feature distribution of the authentic user with respect to a diversity of global feature distribution of all users in a corresponding dimension, wherein the stable key generation step comprises:

a setting step for setting a left boundary and a right boundary of the feature signal distribution in each dimension as $LB+\min(m_g-k_g\sigma_g, m_a-k_a\sigma_a)$ and $RB=\max(m_g+k_g\sigma_g, m_a+k_a\sigma_a)$ respectively, where $m_a$ and $\sigma_a$ are mean and standard deviation of the authentic feature signal distribution in the corresponding dimension, $m_g$ and $\sigma_g$ are mean and standard deviation of a global feature signal distribution in the corresponding dimension, $k_a$ and $k_g$ are parameters, and $(m_a-k_a\sigma_a, m_a+k_a\sigma_a)$ is specified as an authentic region;

a distinguishing step for dividing at least one segment between the left boundary and the right boundary in the corresponding dimension according to the authentic region, wherein a length of each segment is proportional to the length of the authentic region;

an index specifying step for specifying each segment with an index thereby obtaining authentic bit information provided by the feature signal in the corresponding dimension, wherein the length of bit information is proportional to a degree of distinguishability in the dimension; and a cascading step for cascading the bit information provided by the feature signal in each corresponding dimension for obtaining a cryptographic key.

15. The method as claimed in claim 14, wherein the cascading step cascades the bit information provided by the M-dimensional feature signals.

* * * * *